Nov. 15, 1927.

O. HENKER

REFRACTOMETER

Filed Feb. 6, 1925

Inventor:
Otto Henker

Patented Nov. 15, 1927.

1,649,064

UNITED STATES PATENT OFFICE.

OTTO HENKER, OF JENA, GERMANY, ASSIGNOR TO THE FIRM CARL ZEISS, OF JENA, GERMANY.

REFRACTOMETER.

Application filed February 6, 1925, Serial No. 7,416, and in Germany February 8, 1924.

The present invention relates to an apparatus for the objective determination of the refractive power which that spectacle-glass which is to be located in front of an ametropic eye must have in order to render the eye normal-sighted. The apparatus contains in a known way an illuminating device provided with a light-opening for lighting up the background of the eye and a lens system which produces a real image of the background of the eye, whereby the light-opening outside the axis of this lens system is used. Furthermore cross wires, both arms of which intersect in the axis of the lens system, are disposed adjustably along this axis and an observing device is provided having a diaphragm which together with the light-opening are really imaged in the pupil of the eye to be examined in such a way that the two images lie side by side.

When using such an apparatus it is possible that the illumination, in order to render the outline of the cross wires arising on the retina of the eye to be examined yet distinct to the observer produces on the retina such a great superficial luminosity that dazzling appearances of the eye to be examined arise. These appearances may easily lead to disturbances of the examination as, e. g. large contractions of the pupil or epiphora. As, however, the irritation of the eye to be examined not only depends upon the superficial luminosity of the illumination on the retina but also upon the total amount of the light transmitted, according to the invention one refrains from rendering visible the retina to the observer to a larger extent than it is absolutely necessary for the measurement. One therefore connects the cross wires with an opaque disc or the like which only admits of transmitting the light in the immediate vicinity of the cross wires. In this way it is possible to sufficiently illuminate the retina in the small spheres concerned in order to cause the outline of the cross wires to stand out clearly without the arising of objectionable irritations. With a view to removing the reflections produced by the lens system imaging the background of the eye, it is advisable to fit at the place of the cross wires a stop in such a way as to cover the middle part of the cross wires. In order to create a fixing point for the eye to be examined a punctiform opening may be imparted to the diaphragm at that place in which it is intersected by the optical axis.

Figure 1:
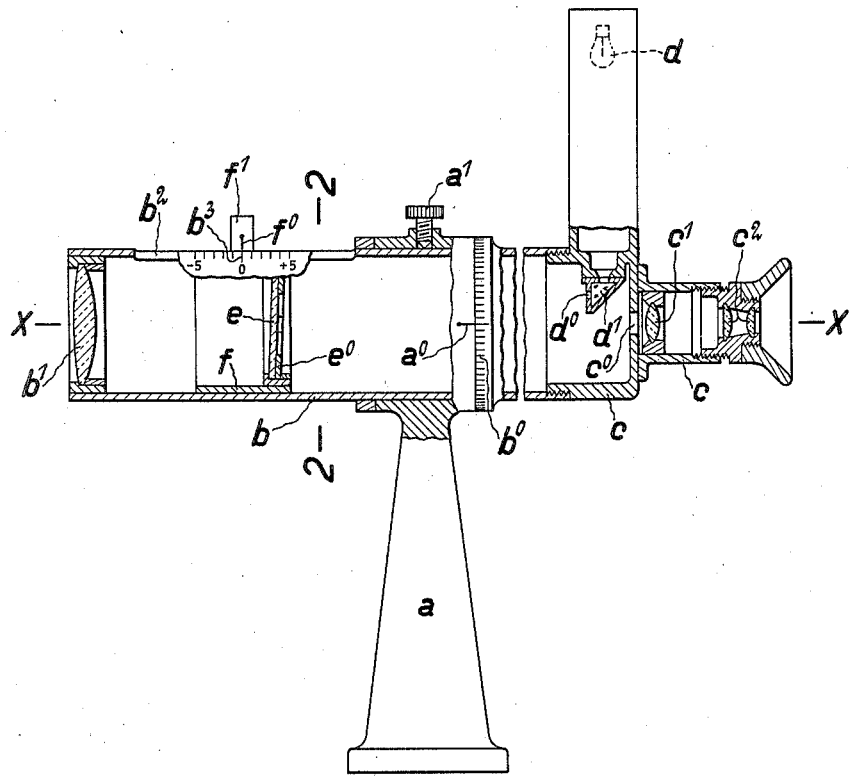
Figure 2:
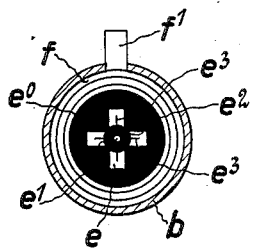
Figure 3:
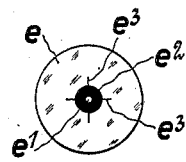

In the annexed drawing an example of an apparatus according to the invention is shown. Fig. 1 is a vertical section through the apparatus containing the optical axis, Fig. 2 is a cross section on the line 2—2 of Fig. 1, Figs. 3 and 4 show a detail in a plan view each, in Fig. 5 a modification of a detail is shown in a cross section.

In a standard $a$ there is supported a tube $b$ rotatable about its axis X—X. The tube can be fixed relatively to the standard $a$ by means of a screw $a^1$, whereby the position in which it is at any one time is indicated on a scale $b^0$ of the tube by an index $a^0$ of the standard. The tube $b$ contains at its one end a lens $b^1$ which serves for producing a real image of the background of the eye to be examined. At the other end of the tube $b$, viz within a casing $c$ screwed to the tube, is disposed a microscope serving for the observation of this image and having an objective $c^1$ fitted close behind a small, circular opening $c^0$ of the casing $c$ and an ocular $c^2$ fitted in a thread-mount, the distance of which ocular from the objective can be adjusted by rotating the ocular. For lighting up the background of the eye an illuminating device is provided, of which only the source of light $d$ is shown. The light emanating from this source of light enters the tube $b$ through a punctiform opening $d^0$ after having traversed a prism $d^1$. The light-opening $d^0$ is so positioned relatively to the diaphragm aperture $c^0$ that both openings are really imaged side by side in the eye-pupil by the lens $b^1$. A small, circular mark $e^1$, a large, circular mark $e^2$ concentric with it and cross wires $e^3$, both arms of which intersect at the centre of both circular marks, are so traced on a glass plate $e$ (see Fig. 3) that the centre of the circular marks lies in the axis of the lens $b^1$. The surface between the two circular marks $e^1$ and $e^2$ is blackened. Upon the dics $e$ is placed a sheet-metal disc $e^0$, having at its centre a cross-shaped opening (vide Fig. 4) in such a way that light can only traverse in the immediate vicinity of the cross arms. The plates $e$ and $e^0$ are disposed in a bushing $f$ supported within the tube $b$ and provided with a member $f^1$ projecting through a slit $b^2$ of the tube $b$ which slit is parallel to the axis of the tube. The bushing can be displaced by means of the member $f$ in the axial direction of the tube $b$, whereby rotations of the bushing relatively to the tube are prevented by the said member. An index $f^0$ of the member $f^1$ indicates on a diopter scale $b^3$ of the tube $b$ the position adjusted at any one time of the mark system.

In order to examine an astigmatic eye the apparatus must be adjusted relatively to the eye to be examined in such a way that the image of the opening $d^0$ lies in the eye-pupil. The patient is then required to continuously fix his eye upon the mark $e^1$, and the ocular $c^2$ is adjusted by means of rotation in such a way that the observer clearly sees the retina. Thereafter it is necessary to turn the tube $b$ into such a position that for the observer the one arm of the cross wires $e^3$ coincides with the image of it produced on the retina. This proves that the plane containing the axis of the lens $b^1$ and the centre of the opening $d^0$ coincides with one of the two principal sections of the eye. Thereupon it is necessary to displace the bushing $f$, viz (in order to avoid a strain of accommodation of the patient) from its rear terminal position until the other arm of the cross wires coincides with the image of it produced on the retina. It is then possible to read off on the scale $b^0$ the meridian of the principal section examined and on the scale $b^3$ the refractive power which the correction spectacle-glass must have in this principal section. Thereupon the tube $b$ is rotated through 90° and the refractive power of the correction spectacle-glass, required for the other principal section, ascertained. With an axially symmetrical eye a single ascertainment in an optical meridian is sufficient.

Figures 4, 5:
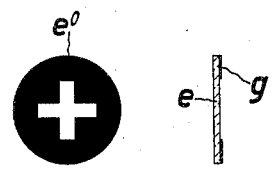

In the modification according to Fig. 5 the glass disc $e$ is provided with an opaque coat $g$, whose shape corresponds to that of the sheet-metal disc $e^0$. Thereby the special disc $e^0$ is rendered useless.

I claim:

1. In an apparatus for the purpose set forth a source of light, a collective lens system, a diaphragm located between the source of light and the lens system and adapted to be imaged by the lens system in the pupil of the eye to be observed, a pair of cross wires intersecting each other in the axis of the lens system, a second diaphragm having a cross-shaped opening and being adapted to cause the light only to traverse in the immediate vicinity of the cross wires, an observing device adapted to receive the light rays emanating from the source of light through the first diaphragm and reflected by the retina of the eye to be observed, and a third diaphragm located in front of the observing device and adapted also to be imaged by the lens system in the said pupil.

2. In an apparatus according to claim 1, a stop connected with the cross wires, which covers the middle part of the same.

3. In an apparatus according to claim 1, a stop connected with the cross wires, which covers the middle part of the same and has a small opening in its middle.

4. In an apparatus for the purpose set forth a source of light, a collective lens system, a diphragm located between the source of light and the lens system offset from and rotatable about the axis of this system and adapted to be imaged by the lens system in the pupil of the eye to be observed, a pair of cross wires intersecting each other in the axis of the lens system and being rotatable about and displaceable along this axis, one of both arms of the cross wires coinciding with the plane containing the said axis and the centre of the said diaphragm, a second diaphragm having a cross-shaped opening and being adapted to cause the light only to traverse in the immediate vicinity of the cross wires, an observing device adapted to receive the light rays emanating from the source of light through the first diaphragm and reflected by the retina of the eye to be observed, a third diaphragm located in front of the observing device and adapted also to be imaged by the lens system in the said pupil, and means adapted to jointly rotate the first named diaphragm and the pair of cross wires.

OTTO HENKER.